(12) United States Patent
Umberger et al.

(10) Patent No.: US 9,313,199 B2
(45) Date of Patent: Apr. 12, 2016

(54) SECURE BIOS ACCESS AND PASSWORD ROTATION

(71) Applicant: Verizon Patent and Licensing Inc., Arlington, VA (US)

(72) Inventors: William G. Umberger, West Sacramento, CA (US); Robert P. Kilgore, Temple Terrace, FL (US); Andrew L. Herman, Silver Spring, MD (US); Rocco Demasi, Orangeburg, NY (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/341,316

(22) Filed: Jul. 25, 2014

(65) Prior Publication Data

US 2016/0028714 A1 Jan. 28, 2016

(51) Int. Cl.
*H04L 29/06* (2006.01)
*G06F 9/44* (2006.01)

(52) U.S. Cl.
CPC ............ *H04L 63/083* (2013.01); *G06F 9/4416* (2013.01); *H04L 63/0861* (2013.01)

(58) Field of Classification Search
CPC ..... G06F 21/80; G06F 21/575; G06F 9/4401; G06F 21/725; G06F 21/554; G06F 21/30; G06F 2221/2135; G06F 9/4416; H04L 9/088; H04L 63/083; H04L 63/0861
See application file for complete search history.

(56) References Cited

U.S. PATENT DOCUMENTS

| | | | |
|---|---|---|---|
| 6,212,635 B1* | 4/2001 | Reardon | 713/165 |
| 2008/0022099 A1* | 1/2008 | Kawano et al. | 713/168 |
| 2008/0052777 A1* | 2/2008 | Kawano et al. | 726/18 |
| 2008/0104409 A1* | 5/2008 | Matsuoka et al. | 713/178 |
| 2009/0150991 A1* | 6/2009 | Hoey et al. | 726/18 |
| 2009/0249496 A1* | 10/2009 | Ohgushi | 726/34 |
| 2010/0310078 A1* | 12/2010 | Kim et al. | 380/282 |
| 2014/0006799 A1* | 1/2014 | Zmudzinski et al. | 713/189 |
| 2014/0041002 A1* | 2/2014 | Liu et al. | 726/7 |

* cited by examiner

*Primary Examiner* — Mohammad A Siddiqi

(57) ABSTRACT

A device may periodically update a BIOS password on a client device. In some implementations, the device may determine a particular password generation algorithm; determine password generation seed values; and generate a first password and one or more second passwords based on the particular password generation algorithm and the password generation seed values. The first password may be a password that should be set for the BIOS. The one or more second passwords may be possible current passwords currently set. The device may individually output the one or more second passwords to the client device to cause the client device to update a password of the BIOS to update to the first password; receive an indication that the BIOS password has been updated to the first password; and output the indication that the BIOS password has been updated to the first password.

20 Claims, 11 Drawing Sheets

300 ⟶

| Client Device Information | Unit ID |
|---|---|
| Client Device ID CD1<br>IP Address 1<br>Serial No. 1 | Unit 1 |
| Client Device ID CD2<br>IP Address 2<br>Serial No. 2 | Unit 1 |
| Client Device ID CD3<br>IP Address 3<br>Serial No. 3 | Unit 1 |
| Client Device ID CD4<br>IP Address 4<br>Serial No. 4 | Unit 2 |
| Client Device ID CD5<br>IP Address 5<br>Serial No. 5 | Unit 2 |
| ⋮ | |

350 ⟶

| Unit ID | PW Generation Algorithm |
|---|---|
| Unit 1 | Algorithm 1 |
| Unit 2 | Algorithm 2 |
| Unit 3 | Algorithm 3 |
| ⋮ | |

Fig. 3

SECURE BIOS ACCESS AND PASSWORD ROTATION

BACKGROUND

A client device (e.g., a desktop computing device, a server device, etc.) may implement a Basic Input/Output System (BIOS). The BIOS, of the client device, may initialize and test system hardware components, load a bootloader or operating system, and/or perform some other pre-boot hardware and/or software function. A user may access the BIOS to modify hardware and/or software settings, perform system maintenance, system upgrades, and/or to load an image (i.e., load a copy of an operating system or other software) on the client device.

BRIEF DESCRIPTION OF THE DRAWINGS

FIG. 3 illustrates example data structures that may store information identifying password generation algorithms for different client devices;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may periodically change passwords in a Basic Input/Output System (BIOS) of a client device in order to prevent unauthorized access of the BIOS. Further, a password associated with the BIOS may be removed in order to permit access to the BIOS by an authorized party (e.g., to perform maintenance, imaging, and/or other functions on the client device). The BIOS may then be locked by a password to prevent unauthorized access of the BIOS. As a result, security of the BIOS may be improved in relation to when the BIOS password is not periodically changed. Further, an authorized party may conveniently access the BIOS.

Figure 1:
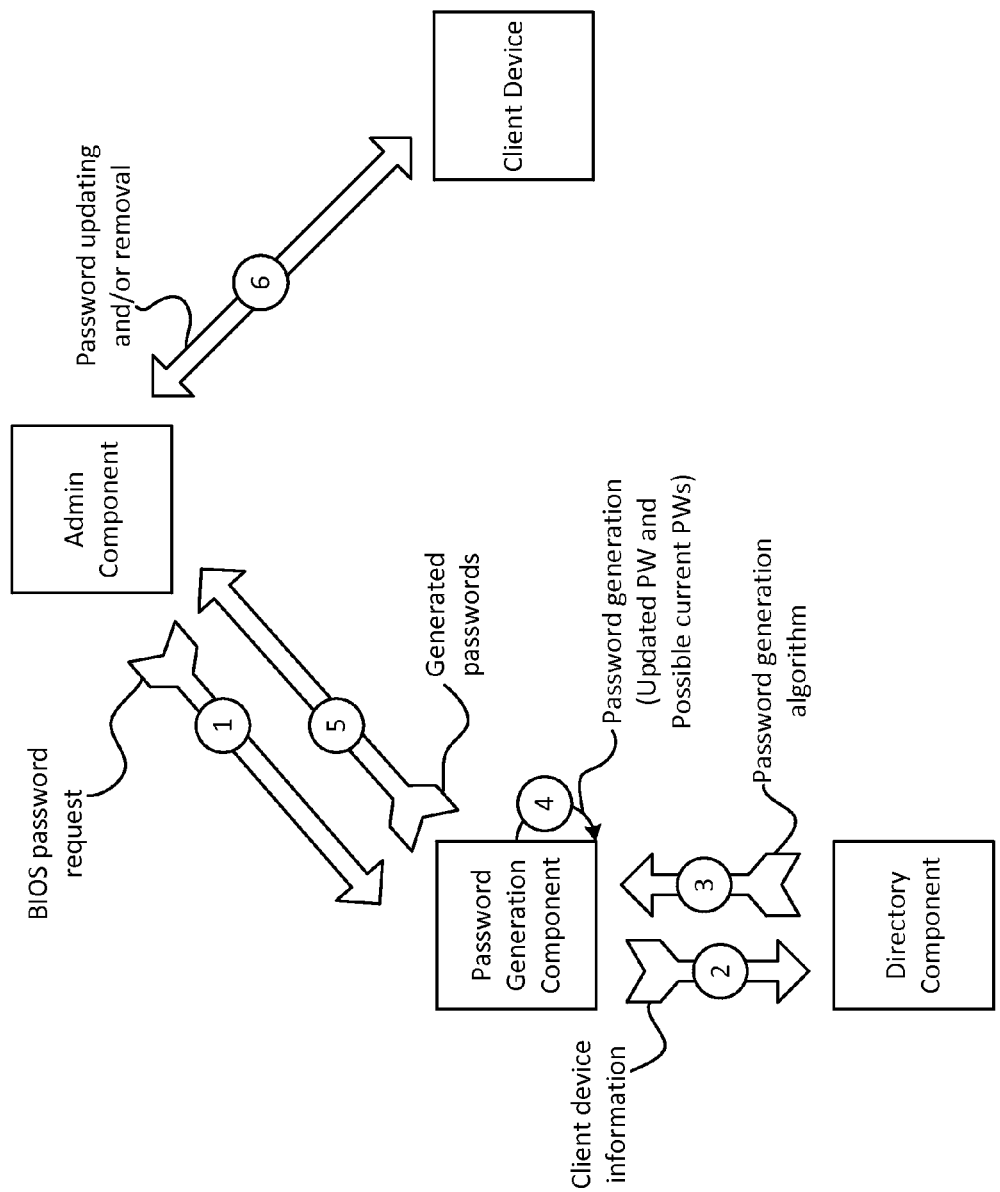
FIG. 1 illustrates an example overview of an implementation described herein.

FIG. 1 illustrates an example overview of an implementation described herein. In FIG. 1 an administrative component (hereinafter referred to as an "admin" component) may be associated with a client device (e.g., a desktop computer, a server device, or the like). For example, the admin component may be implemented as a software application on the client device, and/or as a device that is external to the client device.

As shown in FIG. 1, the admin component may output a BIOS password request to a password generation component (arrow 1). The BIOS password request may include information identifying the client device, and a request for an updated password (e.g., an updated password that should be set for the BIOS of the client device). For example, the updated password may be set for the BIOS as part of a security protocol to periodically change the password of the BIOS (e.g., every month, every 3 months, and/or at some other interval). Additionally, or alternatively, the updated password may be set for the BIOS in order to re-lock the BIOS after the BIOS has been accessed. The BIOS password request may also include a request for possible current passwords. In some implementations, a current password may be required to change the password of the BIOS from the current password to the updated password. Similarly, a current password may be required to remove the current password (e.g., in order to provide access to the BIOS).

As further shown in FIG. 1, the password generation component may output the information regarding the client device (e.g., included in the BIOS password request), to a directory component (arrow 2). The directory component may identify a particular password generation algorithm associated with the client device, and output information identifying the password generation algorithm (arrow 3). For example, different client devices may be part of different business units, organizations, etc., and may be subject to different security protocols corresponding to different password generation algorithms.

Based on receiving the information identifying the password generation algorithm, the password generation component may generate an updated password and possible current passwords (arrow 4). For example, the password generation component may generate an updated password using a current date as a seed value to the password generation algorithm. Alternatively, the password generation component may generate an updated password using a milestone date as the seed value (e.g., a predetermined date, such as a date corresponding to the end of a current month, the end of a current calendar quarter, etc.). For example, a security protocol may indicate the frequency in which a BIOS password should be changed (e.g., every month, every calendar quarter, etc.).

In addition to generating an updated password, the password generation component may generate possible current passwords using previous milestone dates as seed values (e.g., dates corresponding to the end of previous months, the end of previous calendar quarters, and/or some other predetermined milestone dates). In some implementations, the password generation component may generate two, three, four, five, or some other quantity of possible current passwords using corresponding previous milestone dates as seed values. The password generation component may generate multiple possible current passwords in a situation where a client device may have been out of service for an extended period of time (e.g., when the most previous milestone date may not correspond to the current password).

As further shown in FIG. 1, the password generation component may output the generated passwords (e.g., the updated password and the possible current passwords) to the admin component (arrow 5). Based on receiving the generated passwords, the admin component may communicate with the client device (arrow 6) to update the BIOS password. As described above, the current BIOS password may be required to update the BIOS password, or to remove the BIOS password (e.g., in order to access the BIOS). The admin component may attempt to update the password using each of the possible current passwords received from the password generation component until the password change is successful. Additionally, or alternatively, the admin component may attempt to remove the BIOS password using each of the possible current passwords until the BIOS password removal is successful.

After access to the BIOS is no longer needed (e.g., after an imaging process and/or maintenance process requiring BIOS access is completed), the admin component may communicate with the client device to re-lock the BIOS using the updated password received from the password generation component. In some implementations, the admin component may authorize a user to access the BIOS prior to removing the BIOS password. As a result, BIOS passwords may be periodically changed, and the security of the BIOS may be improved in relation to when the BIOS password is not periodically changed.

Figure 2:
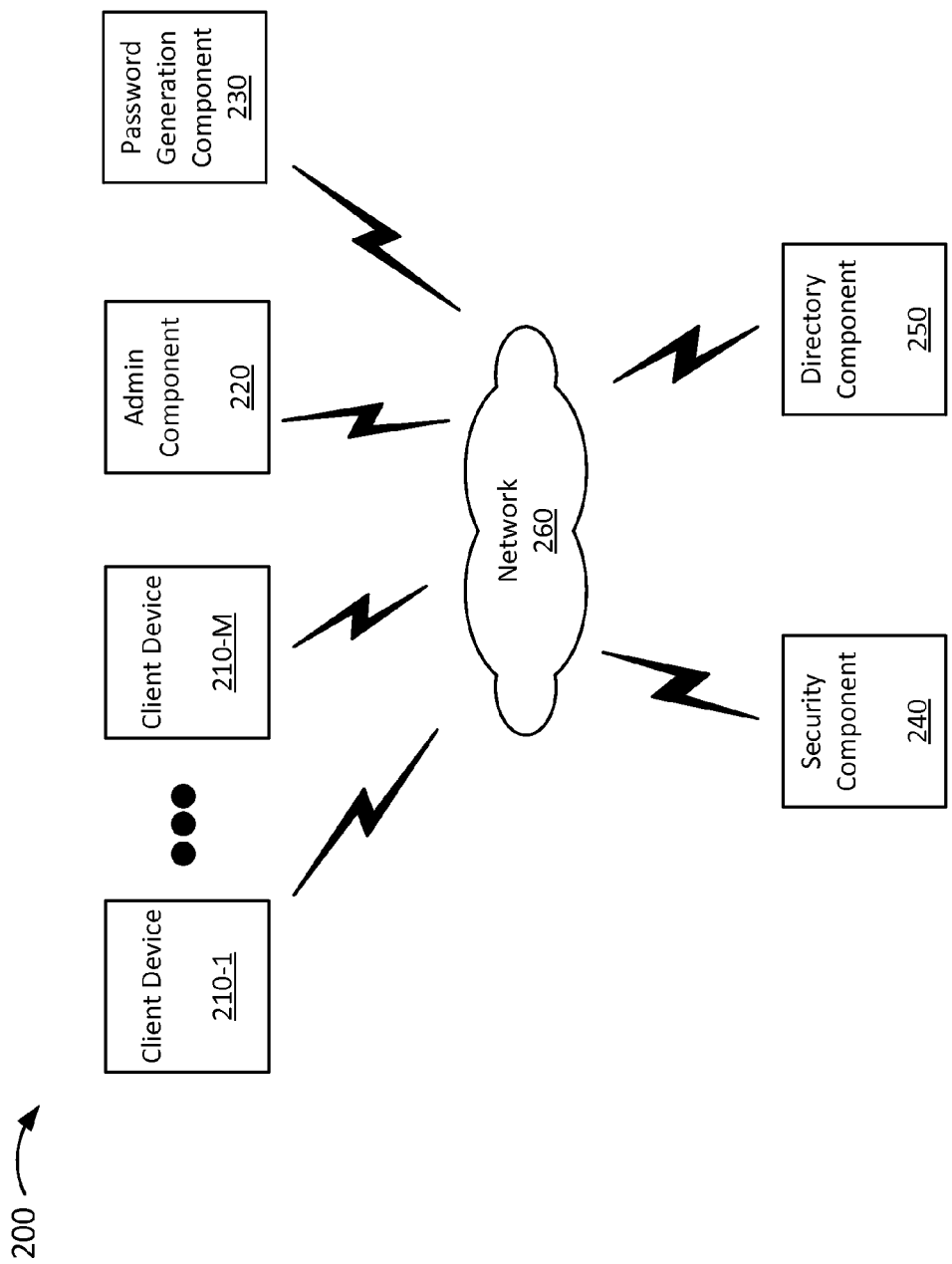
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210-1 through 210-M (where M is an integer greater than or equal to 1), admin component 220, password generation component 230, security component 240, directory component 250, and network 260.

Client device 210 may include one or more computing devices, such as a desktop computing device, a server device, and/or some other type of computing device. In some implementations, client device 210 may include a BIOS to initialize and test system hardware components, load a bootloader or operating system, and/or to perform some other pre-boot hardware and/or software function. In some implementations, a user may access the BIOS to modify hardware and/or software settings, perform system maintenance, system upgrades, and/or to load an image on client device 210. As described above, the BIOS may include a password to prevent unauthorized access.

In some implementations, a first client device 210 (e.g., client device 210-1) may remotely access the BIOS of a second client device 210 (e.g., client device 210-2) via admin component 220. For example, admin component 220 may authorize the user of client device 210-1 to access the BIOS of client device 210-2, and may output software and/or other information that client device 210-1 may use to communicate with client device 210-2 and access the BIOS of client device 210-2.

Admin component 220 may include one or more computing devices, such as a server device or a collection of server devices. Additionally, or alternatively, admin component 220 may be implemented as a software application on client device 210. In some implementations, admin component 220 may request passwords from password generation component 230 in order to update a BIOS password associated with client device 210 and/or to remove the BIOS password in order to provide access to the BIOS. Admin component 220 may request the passwords to update the BIOS password without user interaction, and may communicate with client device 210 to periodically update the BIOS password in accordance with a predetermined security protocol or password update schedule. Admin component 220 may update and/or remove BIOS passwords by communicating with client device 210 via software that may access the BIOS for the purposes of updating and/or removing BIOS passwords.

In some implementations, admin component 220 may request passwords from password generation component 230 in order to remove the BIOS password and provide access to the BIOS, after authorizing the BIOS to be accessed. For example, admin component 220 may authorize BIOS access based on decrypting a security certificate provided by security component 240. Additionally, or alternatively, admin component 220 may authorize BIOS access based on hash calculation and matching techniques. Additionally, or alternatively, admin component 220 may authorize BIOS access based on administrative credentials (e.g., username, administrative password, biometrics information, etc.). Additionally, or alternatively, admin component 220 may authorize BIOS access based on some other information and/or using some other technique. The technique used to authorize BIOS access may be based on the type of level of access requested (e.g., admin component 220 may authorize a request to access the BIOS in order to perform system maintenance using a different technique used to authorize an ad-hoc request to remotely access the BIOS by a remote client device 210).

Password generation component 230 may include one or more computing devices, such as a server device or a collection of server devices. Additionally, or alternatively, password generation component 230 may be implemented as a software application on client device 210. In some implementations, password generation component 230 may receive a BIOS password request from admin component 220, determine seed values (e.g., milestone dates and/or previous milestone dates) used to generate updated and possible current passwords, communicate with directory component 250 to determine a particular password generation algorithm, and generate updated and possible current passwords based on the determined seed values and the determined password generation algorithm. Password generation component 230 may output the generated passwords to admin component 220. In some implementations, password generation component 230 may authenticate admin component 220 prior to outputting the generated passwords.

Security component 240 may include one or more computing devices, such as a server device or a collection of server devices. In some implementations, security component 240 may store authorization information that admin component 220 may use to authorize BIOS access. For example, admin component 220 may receive, from security component 240, a security certificate and/or some other type of computer file that includes information authorizing BIOS access. In some implementations, the security certificate may be encrypted in a format that admin component 220 may decrypt (e.g., in order for admin component 220 to read the security certificate and authorize BIOS access).

In some implementations, security component 240 may store administrative credentials that admin component 220 may use to authorize BIOS access. Additionally, or alternatively, security component 240 may store hashing algorithms that admin component 220 may use to determine a hash value, and compare the hash value with a predetermined value or hash value determined by a software component of admin component 220 or client device 210 (e.g., an imaging application). Additionally, or alternatively, security component 240 may store some other information to authorize BIOS access. As described above, admin component 220 may request passwords in order to permit access to a BIOS after authorizing a request for BIOS access. In some implementations, security component 240 may store information identifying a list of known passwords that may correspond to possible current passwords of a BIOS of client device 210. As described in greater detail below, admin component 220 may request information regarding the known passwords in the event passwords generated by password generation component 230 are invalid.

Directory component 250 may include one or more computing devices, such as a server device or a collection of server devices. In some implementations, directory component 250 may store information identifying multiple client devices 210, and password generation algorithms associated with each client device 210. For example, directory component 250 may store information identifying a business unit or organization associated with a client device 210 having a particular identifier (e.g., serial number, internet protocol (IP) address, etc.). As described above, different business units and/or organizations may be associated with different security protocols and different password generation algorithms.

Network 260 may include one or more wired and/or wireless networks. For example, network 260 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 260 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

FIG. 3 illustrates example data structures 300 and 350 that may store information identifying password generation algorithms for different client devices. In some implementations, data structures 300 and 350 may be stored in a memory of directory component 250. In some implementations, data structures 300 and 350 may be stored in a memory separate from, but accessible by, directory component 250 (e.g., a "cloud" storage device). In some implementations, data structures 300 may be stored by some other device in environment 200, such as client device 210, admin component 220, password generation component 230, and/or security component 240. A particular instance of data structure 300 or 350 may contain different information and/or fields than another instance of data structure 300 or 350.

As shown in FIG. 3, each entry in data structure 300 may store information identifying a particular client device 210 ("Client Device Information"), and a unit ("Unit ID") associated with the particular client device 210 (e.g., a business unit, an organization, etc.). In the example shown in FIG. 3, data structure 300 may store information identifying that client devices 210 having the IDs of CD1, CD2 and CD3 are associated with units having the ID of Unit 1. Further, the client devices 210 having the IDs of CD4, and CD5 are associated with units having the ID of Unit 2.

As further shown in FIG. 3, each entry in data structure 350 may store information identifying a particular password generation algorithm ("PW Generation Algorithm") associated with a particular unit ("Unit ID"). In the example shown in FIG. 3, data structure 300 may store information identifying that the client devices 210 associated with the unit having unit ID of Unit 1 are associated with Algorithm 1. Similarly, client devices 210 associated with the unit having unit ID of Unit 2 are associated with Algorithm 2, and so on.

Information stored by data structures 300 and 350 may be used by directory component 250 to determine a particular password generation algorithm that password generation component 230 should use to generate passwords. Admin component 220 may receive information regarding client device 210 as part of a password generation request, and may output the information regarding client device 210 to directory component 250. Directory component 250 may identify the unit associated with client device 210, and the corresponding password generation algorithm based on information stored by data structures 300 and 350.

While particular fields are shown in a particular format in data structures 300 and 350, in practice, data structures 300 and 350 may include additional fields, fewer fields, different fields, or differently arranged fields than are shown in FIG. 3. Also, FIG. 3 illustrates examples of information stored by data structures 300 and 350. In practice, other examples of information stored by data structures 300 and 350 are possible.

Figure 4:
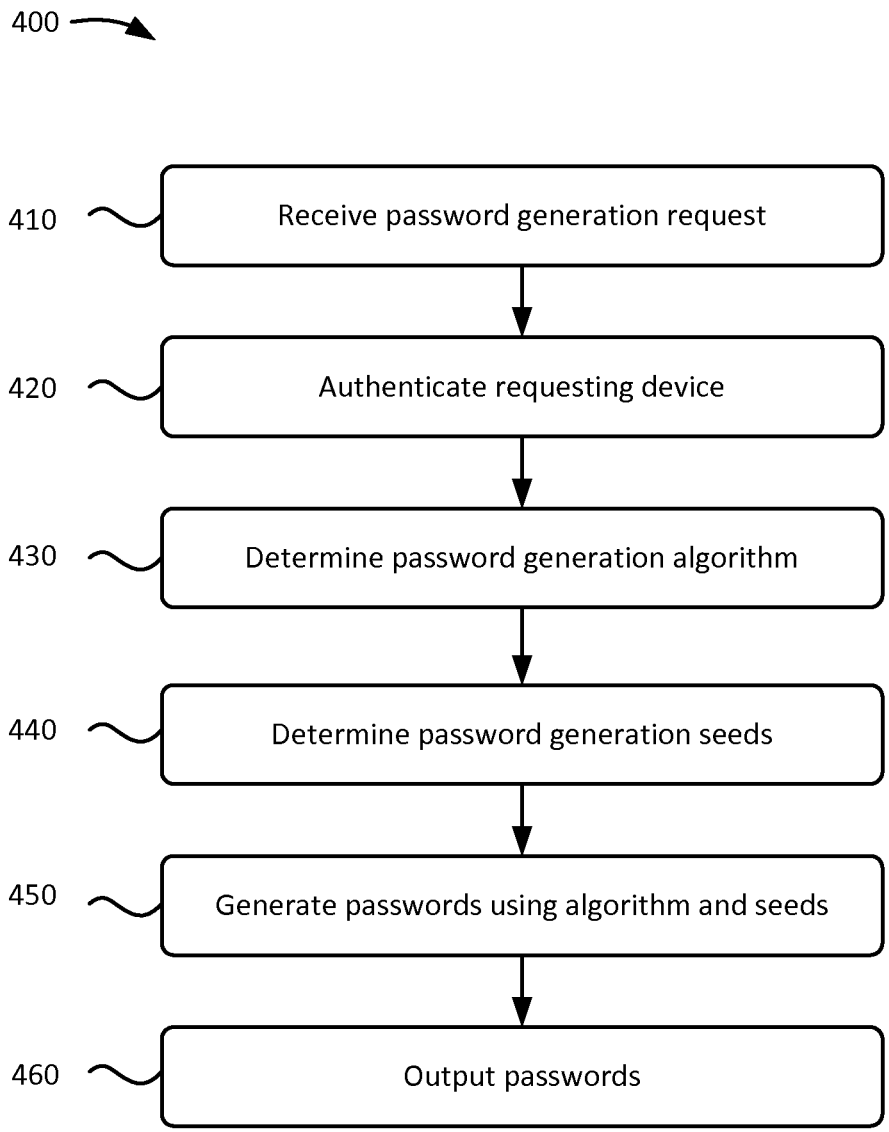
FIG. 4 illustrates a flowchart of an example process for generating and outputting BIOS passwords.

FIG. 4 illustrates a flowchart of an example process 400 for generating and outputting BIOS passwords. In some implementations, process 400 may be performed by password generation component 230. In some implementations, some or all of blocks of process 400 may be performed by one or more other devices.

As shown in FIG. 4, process 400 may include receiving a password generation request (block 410). For example, password generation component 230 may receive a password generation request from admin component 220. In some implementations, the password generation request may include a request for an updated password and a request for possible current passwords of a BIOS of client device 210. The password request may include information regarding client device 210, and/or information that password generation component 230 may use to authenticate admin component 220. As described above, admin component 220 may request passwords from password generation component 230 as part of a security protocol to periodically update the BIOS password. Additionally, or alternatively, admin component 220 may request passwords from password generation component 230 after authorizing BIOS access.

Process 400 may also include authenticating the requesting device (block 420). For example, password generation component 230 may authenticate the device that requested the passwords (e.g., admin component 220). In some implementations, password generation component 230 may authenticate admin component 220 based on authentication information received from admin component 220 as part of the request (e.g., administrative credentials, IP address information indicating that the request came from within an authorized network, and/or some other type of authentication information).

Process 400 may further include determining a password generation algorithm (block 430). For example, password generation component 230 may communicate with directory component 250 to determine the password generation algorithm associated with client device 210. As described above, different client devices 210 may be part of different business units, organizations, etc., and may be subject to different security protocols corresponding to different password generation algorithms. In some implementations, password generation component 230 may output the information regarding client device 210 to directory component 250. Based on receiving this information, directory component 250 may identify a unit associated with client device 210 and a password generation algorithm associated with the unit. Directory component 250 may output information regarding the password generation algorithm to password generation component 230.

Process 400 may also include determining password generation seeds (block 440). For example, password generation component 230 may determine password generation seeds that may correspond to milestone dates. A milestone date may correspond to a date at the beginning or end of a month, calendar quarter, calendar year, or the like. Password generation component 230 may determine the milestone dates based on a security protocol that indicates dates and/or frequencies in which BIOS passwords should be changed. As an example, assume that a current date is Jun. 30, 2014, and that the security protocol indicates that BIOS passwords should be changed each on the last day of each calendar quarter. Given this assumption, password generation component 230 may determine milestone dates of Jun. 30, 2014; Mar. 31, 2014; Dec. 31, 2013, etc. The corresponding password generation seeds may be related to the milestone dates of Jun. 30, 2014; Mar. 31, 2014; Dec. 31, 2013, etc.

Process 400 may further include generating passwords using the algorithm and the seeds (block 450). For example, password generation component 230 may generate updated and possible current passwords using the determined algorithm and the determined seeds. In some implementations, the most current milestone date may be used as a seed to generate an updated password. Previous milestone dates may be used as seeds to generate possible current passwords. In some implementations, block 430 may be omitted, and a default password generation algorithm may be used to generate the passwords.

Process 400 may also include outputting the passwords (block 460). For example, password generation component 230 may output the generated passwords to admin component 220. As described in greater detail below, admin component 220 may receive the generated passwords, and may use the generated passwords to update a BIOS password. Additionally, or alternatively, admin component 220 may use the generated passwords to remove a current BIOS password (e.g., to provide access to BIOS), and to re-lock the BIOS (after access to the BIOS is no longer needed) using the updated password.

Figure 5:
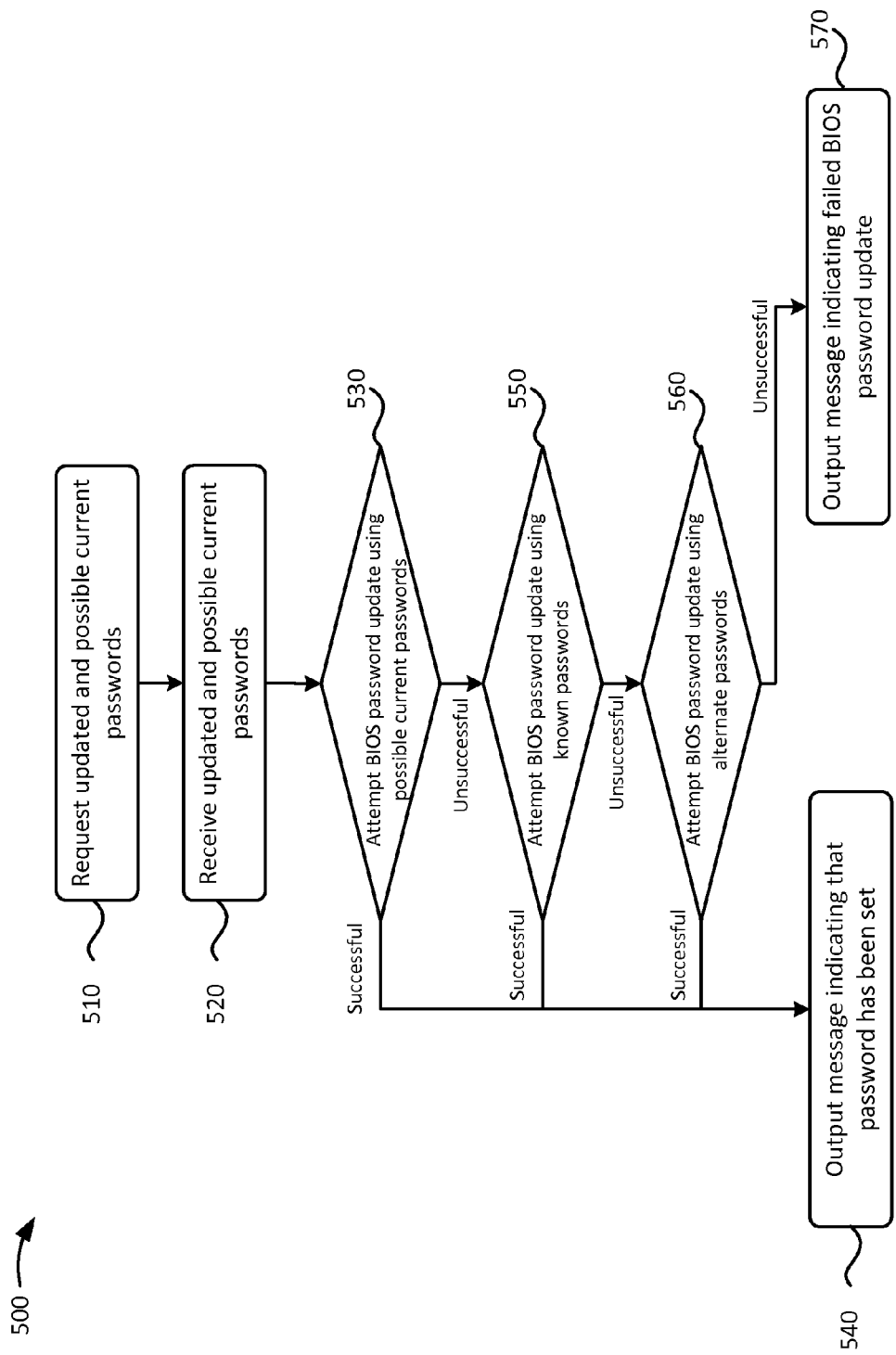
FIG. 5 illustrates a flowchart of an example process for updating a BIOS password.

FIG. 5 illustrates a flowchart of an example process 500 for updating a BIOS password. In some implementations, process 500 may be performed by admin component 220. In some implementations, some or all of blocks of process 500 may be performed by one or more other devices.

As shown in FIG. 5, process 500 may include requesting updated and possible current passwords (block 510). For example, admin component 220 may request the updated and possible current passwords from password generation component 230. In some implementations, admin component 220 may request the passwords without user interaction. For example, admin component 220 may request the passwords on a milestone date when a BIOS password should be updated (e.g., in accordance with a security protocol to periodically update the password at periodic intervals). In some implementations, admin component 220 may request the passwords based on receiving an instruction from an operator of admin component 220.

As described above, admin component 220 may then output information regarding client device 210 as part of the request (e.g., information regarding the client device 210 whose BIOS password should be updates). In some implementations, admin component 220 may request one, two, three, four, five, or any number of possible current passwords from password generation component 230. Based on receiving the request, password generation component 230 may generate and output the updated and possible current passwords, in accordance with process 400 as described above.

Process 500 may further include receiving updated and possible current passwords (block 520). For example, admin component 220 may receive the updated and possible current passwords after password generation component 230 generates the updated and possible current passwords.

Process 500 may also include attempting a BIOS password update using the possible current passwords (block 530). For example, admin component 220 may attempt to update the BIOS password to the updated password received from password generation component 230. In some implementations, admin component 220 may communicate with client device 210 in order to attempt the BIOS password update (e.g., via software that may access the BIOS for updating the BIOS password, or by directly invoking access to a login screen of the BIOS of client device 210). Admin component 220 may include a possible current password as part of a function to update the password. For example, as described above, the current BIOS password may be required to update the password.

When attempting to update the password, admin component 220 may first use the possible current password that was generated using the most recent previous milestone date as a seed. If the BIOS password does not update, admin component 220 may receive a message from client device 210 indicating that the BIOS password has not updated (thereby indicating that the first possible current password is invalid). Admin component 220 may then attempt to update the password using the second possible current password received from password generation component 230. If the BIOS password does not update (e.g., indicating that the second possible current password is invalid), admin component 220 may then attempt to update the password using the third possible current password, until all the possible current passwords, received from password generation component 230, have been used to attempt to update the BIOS password.

If any of the possible current passwords are valid (block 530-SUCCESSFUL), process 500 may include outputting a message indicating that the password has been updated (block 540). For example, admin component 220 may receive an indication, from client device 210, that the password has been updated, and admin component 220 may output a message corresponding to this indication. Alternatively, admin component 220 may receive an indication that the password has been successfully updated if no BIOS password currently exists (e.g., if the BIOS password was previously removed and never re-locked with a password, if a BIOS password was never set, etc.).

If, on the other hand, none of the possible current passwords are valid (block 530-UNSUCCESSFUL), process 500 may include attempting a BIOS password update using known passwords (block 550). For example, admin component 220 may request information regarding a list of known passwords from security component 240. In some implementations, the list of known passwords may include a list of possible current, or past, passwords for the BIOS of client device 210 (e.g., passwords that may have been manually set and/or set using a different algorithm or seed value than that used by password generation component 230 when generating the possible current passwords). Based on receiving the list of known passwords, admin component 220 may attempt to update the BIOS password using each password in the known list until the current BIOS password is successfully updated.

If any of the known passwords are valid (block 550-SUCCESSFUL), process 500 may include outputting a message indicating that the password has been updated (block 540). For example, admin component 220 may receive an indication, from client device 210, that the password has been updated, and admin component 220 may output a message corresponding to this indication.

If, on the other hand, none of the known passwords are valid (block 550-UNSUCCESSFUL), process 500 may include attempting a BIOS password update using alternate passwords (block 560). For example, admin component 220 may request alternate passwords from password generation component 230. In some implementations, admin component 220 may request password generation component 230 to generate alternate passwords using a different password generation algorithm than the password generation algorithm associated with client device 210 (e.g., in a situation where the BIOS password may have been inadvertently set using an incorrect password generation algorithm associated with a different unit associated with client device 210). Admin component 220 may receive alternate passwords from password generation component 230, and attempt the BIOS password update using each of the alternate passwords until the current BIOS password is successfully updated.

If any of the alternate passwords are valid (block 550-SUCCESSFUL), process 500 may include outputting a message indicating that the password has been updated (block 540). If, on the other hand, none of the alternate passwords are valid (block 550-UNSUCCESSFUL), process 500 may include outputting a message indicating that the BIOS password update has failed (block 570). For example, admin component 220 may output the message to alert an operator associated with client device 210 that the BIOS password update has failed so that the operator may troubleshoot or manually attempt to update the BIOS password (e.g., by initiating a factory reset of the BIOS or using some other technique).

Figure 6:
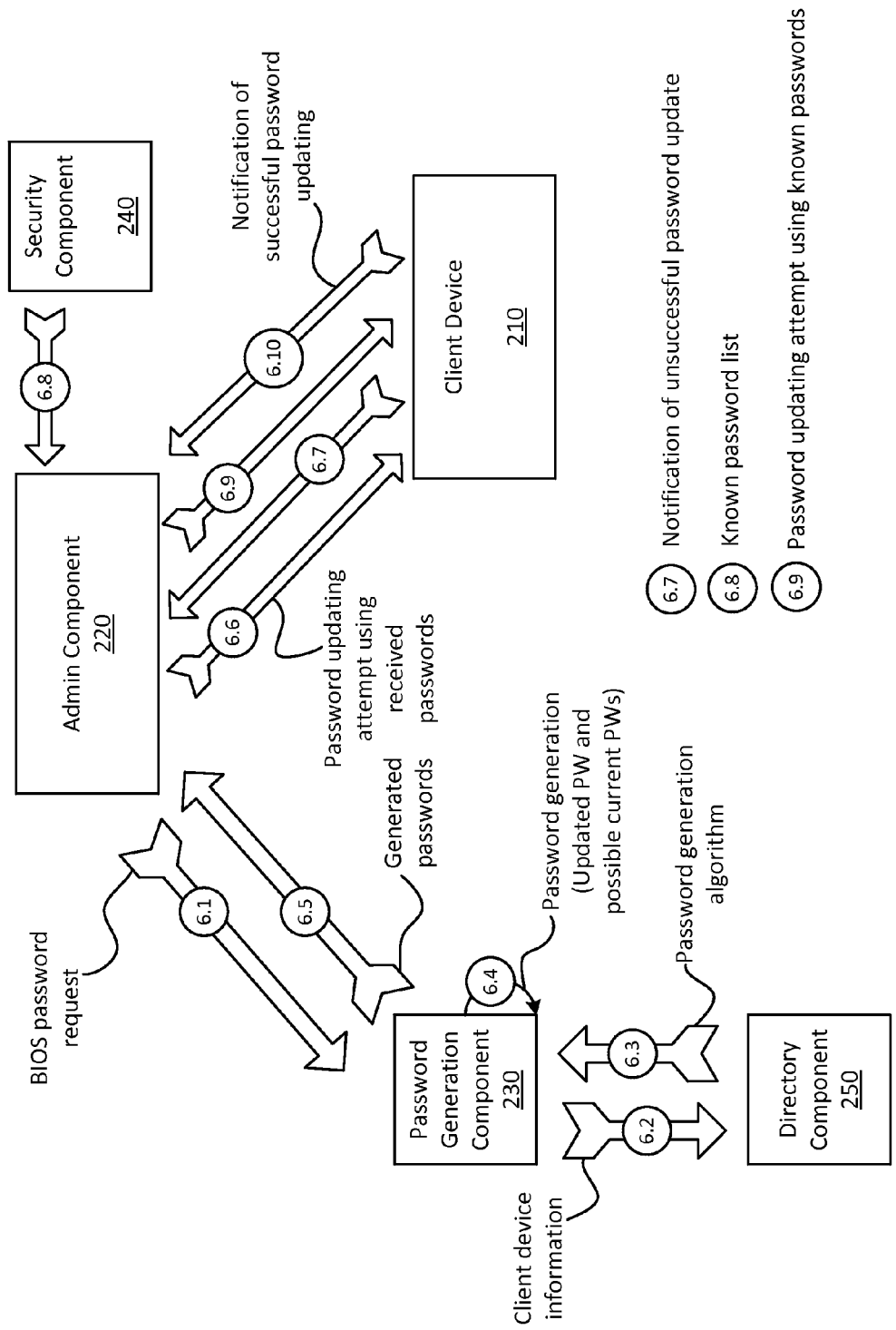
FIGS. 6-7 illustrate an example implementation for updating a BIOS password.
Figure 7:
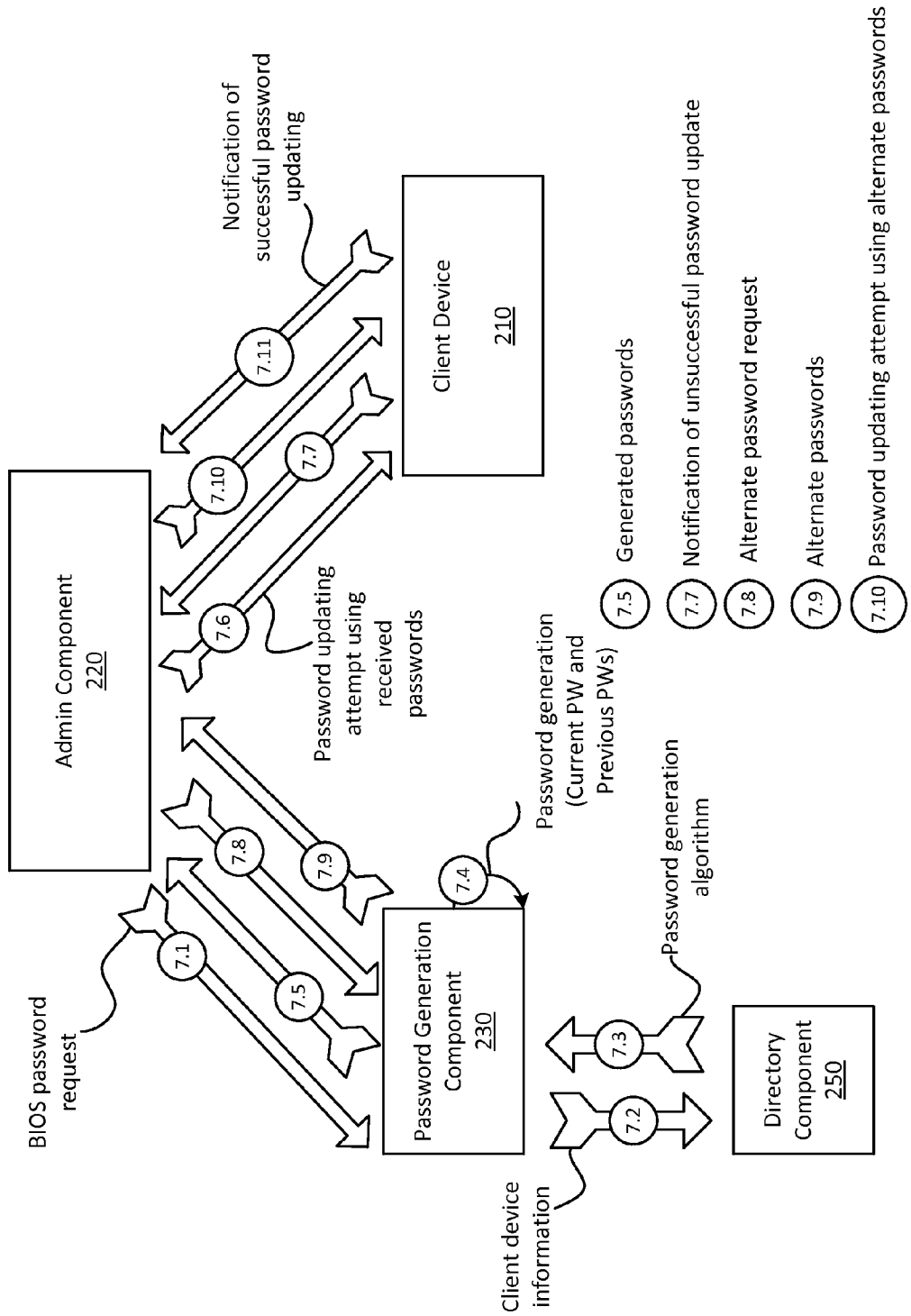

FIGS. 6-7 illustrate an example implementation for updating a BIOS password. As shown in FIG. 6, admin component 220 may request BIOS passwords (e.g., an updated password and possible current passwords) for client device 210 from password generation component 230 (arrow 6.1). For example, admin component 220 may request the passwords in response to receiving an instruction from an operator of admin component 220. Alternatively, admin component 220 may request the passwords on a milestone date when the BIOS password of client device 210 should be updated (e.g., in accordance with a security protocol identifying the milestone date).

Based on receiving the request for the passwords, password generation component 230 may output information regarding client device 210 to directory component 250 (arrow 6.2). Directory component 250 may identify a particular password generation algorithm based on the information regarding client device 210 and information stored by data structures 300 and 350. Directory component 250 may output information regarding the password generation algorithm to password generation component 230 (arrow 6.3). Password generation component 230 may generate an updated password and possible current passwords (arrow 6.4). As described above, password generation component 230 may generate an updated password based on the password generation algorithm and a current milestone date as a seed value. Password generation component 230 may generate the possible current passwords based on the password generation algorithm and previous milestone dates as seed values. Password generation component 230 may output the generated passwords to admin component 220 (arrow 6.5).

As further shown in FIG. 6, admin component 220 may communicate with client device 210 to attempt to update the BIOS password to the updated password generated by password generation component 230 (arrow 6.6). For example, admin component 220 may individually output each current password as part of the password update attempt. Client device 210 may output a notification (arrow 6.7) indicating that the password update attempts were unsuccessful. For example, client device 210 may output the notification each time a password update attempt is made using a possible current password. In FIG. 6, assume that none of the possible current passwords, received from password generation component 230, are valid. Given this assumption, admin component 220 may request a list of known passwords from security component 240, and security component 240 may provide the list of known passwords to admin component 220 (arrow 6.8). Admin component 220 may attempt to update the BIOS password using the list of known passwords (arrow 6.9). If any of the known passwords are valid, client device 210 may output a notification indicating that the password has been successfully updated (arrow 6.10).

Referring to FIG. 7, admin component 220 may request alternate passwords from password generation component 230 if none of the possible current passwords, generated by admin component 220, are valid. For example, as shown in FIG. 7, admin component 220 may request BIOS passwords (arrow 7.1). Password generation component 230 may output information regarding client device 210 to directory component 250 (arrow 7.2), receiving information regarding the password generation algorithm (arrow 7.3), and generate an updated password and possible current passwords (arrow 7.4). As described above, password generation component 230 may generate an updated password based on the password generation algorithm and a current milestone date as a seed value. Password generation component 230 may generate the possible current passwords based on the password generation algorithm and previous milestone dates as seed values.

Password generation component 230 may output the generated passwords to admin component 220 (arrow 7.5), and admin component 220 may communicate with client device 210 to attempt to update the BIOS password to the updated password generated by password generation component 230 (arrow 7.6). Client device 210 may output a notification (arrow 7.7) indicating that the password update attempts were unsuccessful (e.g., each time a password update attempt is made using a possible current password). In FIG. 7, assume that none of the possible current passwords, received from password generation component 230, are valid. Given this assumption, admin component 220 may request alternate passwords (arrow 7.8), and password generation component 230 may output alternate possible current passwords (arrow 7.9). In some implementations, password generation component 230 may generate the alternate possible current passwords using a different password generation algorithm than that associated with client device 210. Alternatively, password generation component 230 may generate the alternate possible current passwords using different seed values. Based on receiving the alternate possible current passwords, admin component 220 may attempt to update the BIOS password (arrow 7.10). If any of the alternate possible current passwords are valid, client device 210 may output a notification indicating that the password has been successfully updated (arrow 7.11).

Figure 8:
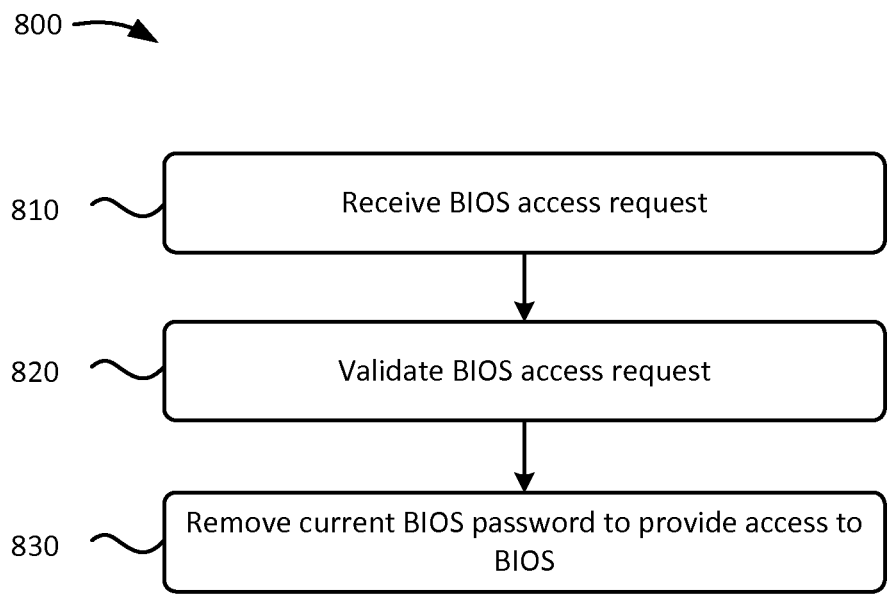
FIG. 8 illustrates a flowchart of an example process for removing a BIOS password in order to provide access to the BIOS.

FIG. 8 illustrates a flowchart of an example process 800 for removing a BIOS password in order to provide access to the BIOS. In some implementations, process 800 may be performed by admin component 220. In some implementations, some or all of blocks of process 800 may be performed by one or more other devices.

As shown in FIG. 8, process 800 may include receiving a BIOS access request (block 810). For example, admin component 220 may receive a request to access a BIOS of a particular client device 210 from an operator of the particular client device 210 and/or an operator of admin component 220. In some implementations, admin component 220 may receive the request from an operator of a remote client device 210 (e.g., an ad-hoc type request). In some implementations, admin component 220 may receive the request from a software distribution component associated with admin component 220. In some implementations, admin component 220 may receive the request to access the BIOS in order to perform maintenance on client device 210, initiate an imaging process on client device 210, and/or to perform some other function on client device 210 that requires BIOS access.

In some implementations, the request may include authentication and/or authorization information to authorize the BIOS access. For example, the request may include an encrypted security certificate and/or other computer file received from security component 240. In some implementations, an operator may upload the file to admin component 220, and/or direct security component 240 to output the file to admin component 220. Security component 240 may output the file to admin component 220 after authorizing a requestor of the file. In some implementations, the request may include a hash value generated by the software distribution component (e.g., hash value generated based on a date, a hostname associated with client device 210, and/or some other information). In some implementations, the request may include administrative credentials (e.g., a username, an administrative password, biometrics information, etc.).

Process 800 may further include validating the BIOS access request (block 820). For example, admin component 220 may validate the BIOS access request based on the authentication and/or authorization included in the BIOS access request. As an example, assume that the BIOS access request includes an encrypted file. Given this assumption, admin component 220 may decrypt the file and validate the BIOS access request based on information included in the decrypted file. As another example, assume that the BIOS access request includes a hash value generated by a software distribution component. Given this assumption, admin component 220 may generate a hash value (e.g., based on a date, a hostname associated with client device 210, and/or some other information) and determine whether the hash value, generated by admin component 220, matches the hash value included in the BIOS access request. As another example, admin component 220 may validate administrative credentials by communicating with security component 240 to determine whether administrative credentials, received as part of the BIOS access request, match administrative credentials stored by security component 240. Additionally, or alternatively, admin component 220 may validate the BIOS access request using some other information and/or technique.

Process 800 may further include removing the current BIOS password to provide access to the BIOS. For example, admin component 220 may communicate with client device 210 to remove the current BIOS password. As described above, admin component 220 may provide the current BIOS password to client device 210 in order to authorize the removal of the current BIOS password. As described in greater detail below with respect to FIG. 9, admin component 220 may communicate with password generation component 230 to receive possible current passwords, and may individually output the possible current passwords until receiving an indication that one of the possible current passwords is valid. Once the password has been removed, admin component 220 may access the BIOS in order to perform maintenance, initiate an imaging process on client device 210, and/or to perform some other function on client device 210 that requires BIOS access.

Figure 9:
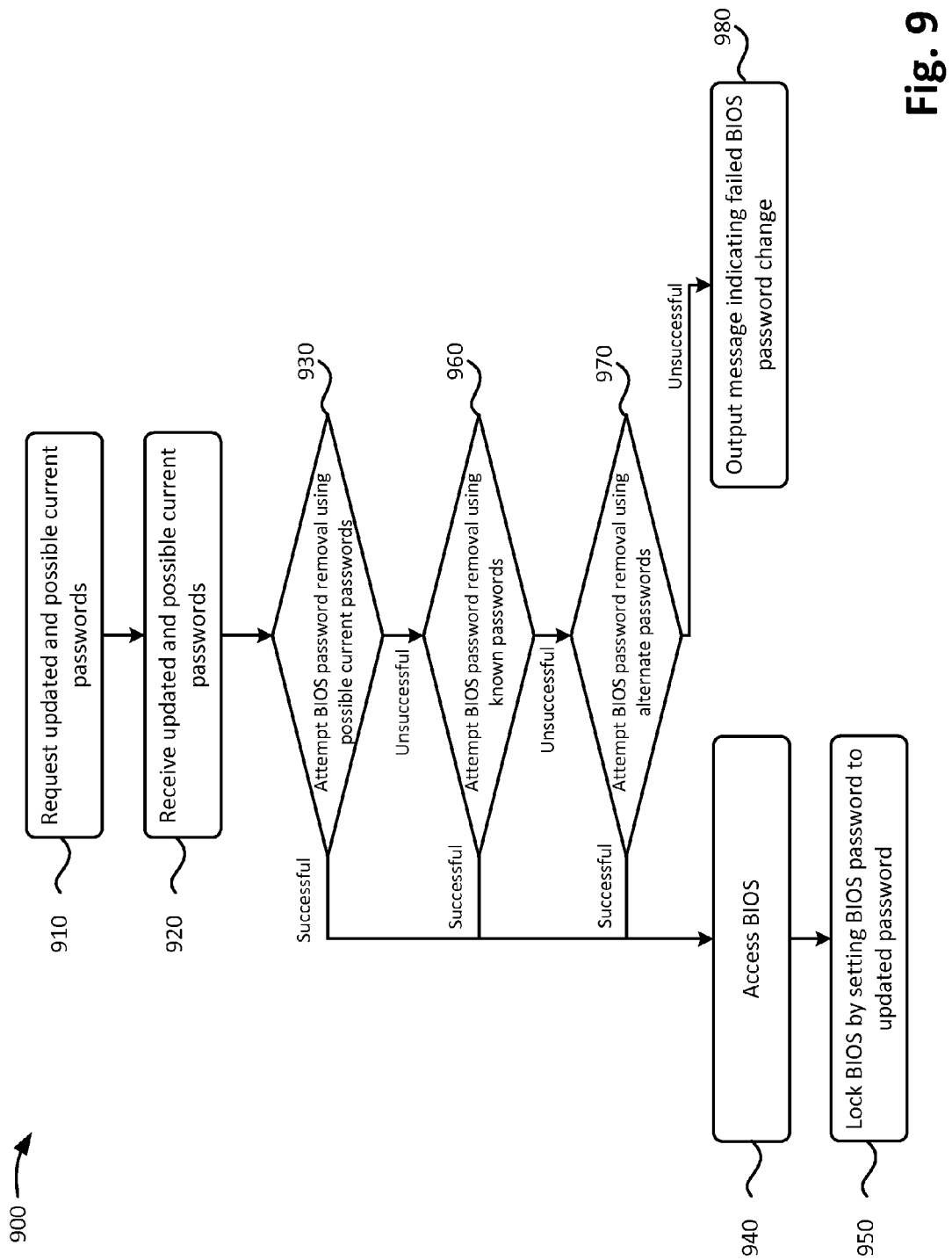
FIG. 9 illustrates a flowchart of an example process for removing a BIOS password in order to access a BIOS.

FIG. 9 illustrates a flowchart of an example process 900 for removing a BIOS password in order to access a BIOS. In some implementations, process 900 may be performed by admin component 220. In some implementations, some or all of blocks of process 900 may be performed by one or more other devices. Process 900 may correspond to operations of process block 830 of process 800.

As shown in FIG. 9, process 900 may include may include requesting updated and possible current passwords (block 910). For example, admin component 220 may request the updated and possible current passwords from password generation component 230 based on validating a BIOS access request.

As described above, admin component 220 may output the information regarding client device 210 as part of the request (e.g., information regarding the client device 210 whose BIOS password should be updates). In some implementations, admin component 220 may request one, two, three, four, five, or any number of possible current passwords from password generation component 230. Based on receiving the request, password generation component 230 may generate and output the updated and possible current passwords, in accordance with process 400 as described above.

Process 900 may further include receiving updated and possible current passwords (block 920). For example, admin component 220 may receive the updated and possible current passwords after password generation component 230 generates the updated and possible current passwords.

Process 900 may also include attempting BIOS password removal using the possible current passwords (block 930). For example, admin component 220 may attempt to remove the BIOS password in order to access the BIOS. In some implementations, admin component 220 may communicate with client device 210 in order to attempt to remove the BIOS password (e.g., via software that may access the BIOS for removing the BIOS password, or by directly invoking access to a password management function of the BIOS of client device 210). Admin component 220 may individually output possible current passwords as part of a function to remove the password. For example, as described above, the current BIOS password may be required to remove the password.

When attempting to remove the password, admin component 220 may first use the possible current password that was generated using the most recent previous milestone date as a seed. If the BIOS remove password attempt is unsuccessful, admin component 220 may receive a message from client device 210 indicating that the BIOS password has not been removed (thereby indicating that the first possible current password is invalid). Admin component 220 may then attempt to remove the password using the second possible current password received from password generation component 230. The BIOS remove password attempt is unsuccessful (e.g., indicating that the second possible current password is invalid), admin component 220 may then attempt to remove the password using the third possible current password, until all the possible current passwords, received from password generation component 230, have been used to attempt to remove the BIOS password.

If any of the possible current passwords are valid (block 930-SUCCESSFUL), process 900 may include accessing the BIOS (block 940). For example, admin component 220 may access the BIOS to initiate an imaging process, maintenance process, and/or perform some other function that requires BIOS access. Additionally, or alternatively, admin component 220 may output an indication to an operator of admin component 220 that the password has been removed, and that the BIOS is available (e.g., to permit the operator to perform a function on client device 210 requiring BIOS access). Alternatively, admin component 220 may access the BIOS if no BIOS password currently exists (e.g., if the BIOS password was previously removed and never re-locked with a password, if a BIOS password was never set, etc.).

Process 900 may also include locking the BIOS by setting the BIOS password to the updated password (block 950). For example, after BIOS access is no longer needed (e.g., after an imaging process has completed, a maintenance process has completed, etc.), admin component 220 may communicate with client device 210 to set the BIOS password to the updated password generated and received from password generation component 230 (e.g., to protect access to the BIOS).

If, on the other hand, none of the possible current passwords are valid (block 930-UNSUCCESSFUL), process 900 may include attempting a BIOS password removal using known passwords (block 960). For example, admin component 220 may request information regarding a list of known passwords from security component 240. In some implementations, the list of known passwords may include a list of possible current passwords for the BIOS of client device 210 (e.g., passwords that may have been manually set and/or set using a different algorithm or seed value than that used by password generation component 230 when generating the possible current passwords). Based on receiving the list of known passwords, admin component 220 may attempt to remove the BIOS password using each password in the known list until the current BIOS password is successfully removed.

If any of the known passwords are valid (block 960-SUCCESSFUL), process 900 may include accessing the BIOS (block 940), and locking the BIOS (block 950) as described above. If, on the other hand, none of the known passwords are valid (block 990-UNSUCCESSFUL), process 900 may include attempting BIOS password removal using alternate passwords (block 970). For example, admin component 220 may request alternate passwords from password generation component 230. In some implementations, admin component 220 may request password generation component 230 to generate alternate passwords using a different password generation algorithm than the password generation algorithm associated with client device 210 (e.g., in a situation where the BIOS password may have been inadvertently set using an incorrect password generation algorithm associated with a different unit associated with client device 210). Admin component 220 may receive alternate passwords from password generation component 230, and attempt the BIOS password removal using each of the alternate passwords until the current BIOS password is successfully removed.

If any of the alternate passwords are valid (block 970-SUCCESSFUL), process 900 may include accessing the BIOS (block 940), and locking the BIOS (block 950) as described above. If, on the other hand, none of the alternate passwords are valid (block 970-UNSUCCESSFUL), process 900 may include outputting a message indicating that the BIOS password removal has failed (block 980). For example, admin component 220 may output the message to alert an operator associated with client device 210 that the BIOS password removal has failed so that the operator may troubleshoot or manually attempt to remove the BIOS password (e.g., by initiating a factory reset of the BIOS or using some other technique).

Figure 10:
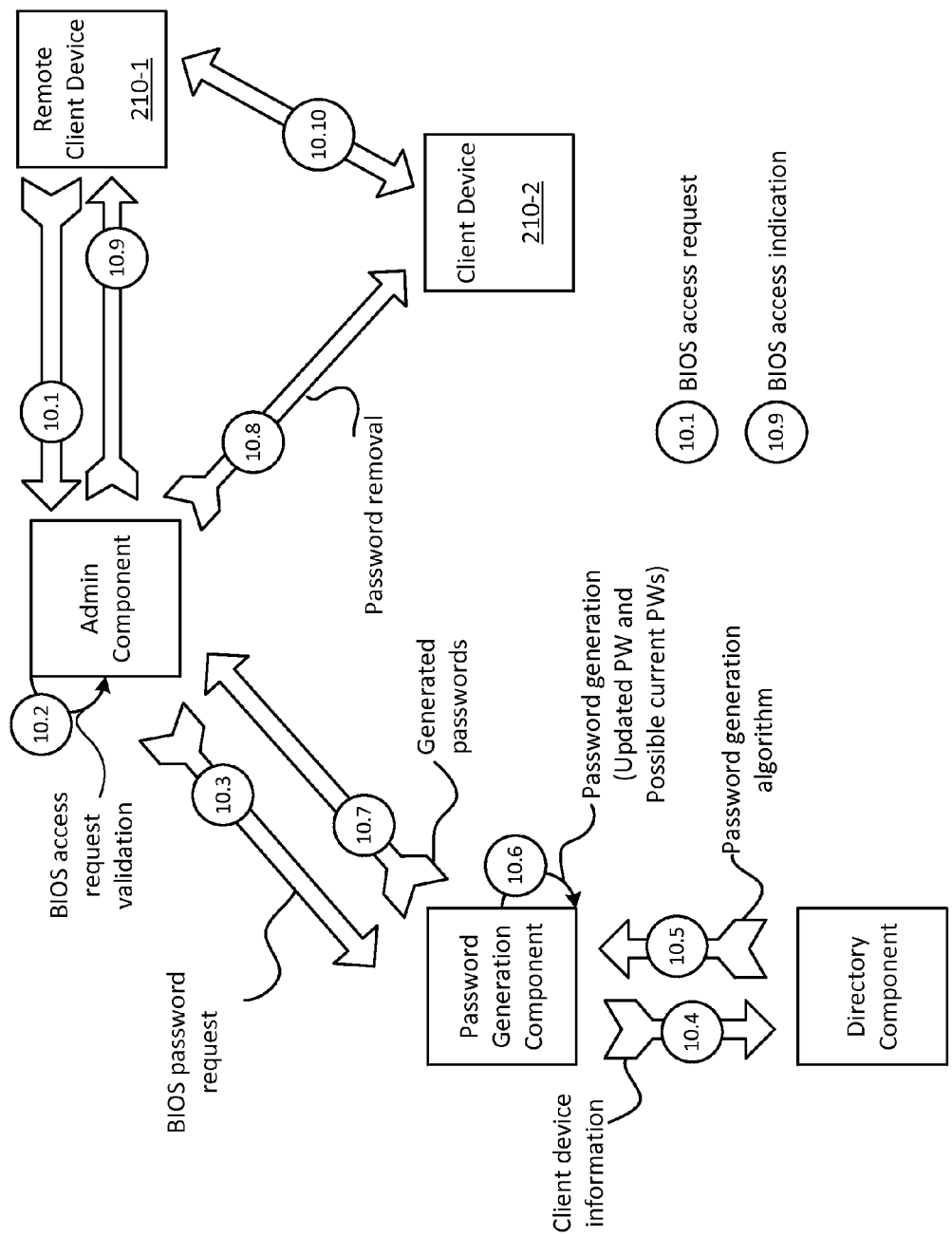
FIG. 10 illustrates an example implementation for providing remote access to a BIOS.

FIG. 10 illustrates an example implementation for providing remote access to a BIOS. As shown in FIG. 10, a remote client device 210 (e.g., remote client device 210-1) may request access to a BIOS associated with a client device 210-2 (arrow 10.1). When requesting the BIOS access, client device 210-1 may also output information identifying client device 210-2, and authorization information that admin component 220 may use to validate the BIOS access request. Admin component 220 may receive the BIOS access request, and validate the access request (arrow 10.2) based on the authorization information received as part of the BIOS access request. Based on validating the access request, admin component 220 may request BIOS passwords (e.g., an updated password and possible current passwords) from password generation component 230 (arrow 10.3). Password generation component 230 may output information regarding client device 210-2 (arrow 10.4) to directory component 250, and receive information identifying a password generation algorithm (arrow 10.5). Password generation component 230 may generate an updated password and possible current passwords (arrow 10.6). As described above, password generation component 230 may generate an updated password based on the password generation algorithm and a current milestone date as a seed value. Password generation component 230 may generate the possible current passwords based on the password generation algorithm and previous milestone dates as seed values.

Password generation component 230 may output the generated passwords to admin component 220 (arrow 10.7), and admin component 220 may communicate with client device 210 to attempt to remove the BIOS password by individually providing possible current passwords as part of a function to remove the BIOS password (arrow 10.8). In FIG. 10, assume that one of the possible current passwords is valid. Given this assumption, admin component 220 may receive an indication that the BIOS password has been removed, and may output an indication, to remote client device 210-1 that the BIOS may be accessed (arrow 10.9). In some implementations, admin component 220 may output software and/or other information that remote client device 210-1 may use to access the BIOS of client device 210-2. Client device 210-1 may then communicate with client device 210-2 (arrow 10.10) to access the BIOS in order to perform a function on client device 210-2 that requires BIOS access.

While a particular example has been shown in FIG. 10, other examples are possible than what is shown. For example, in some implementations, admin component 220 may output software and/or other information that remote client device 210-1 may use to request passwords from password generation component 230, remove the BIOS password from client device 210-2, access the BIOS of client device 210-2, and lock the BIOS after access to the BIOS is no longer needed.

Figure 11:
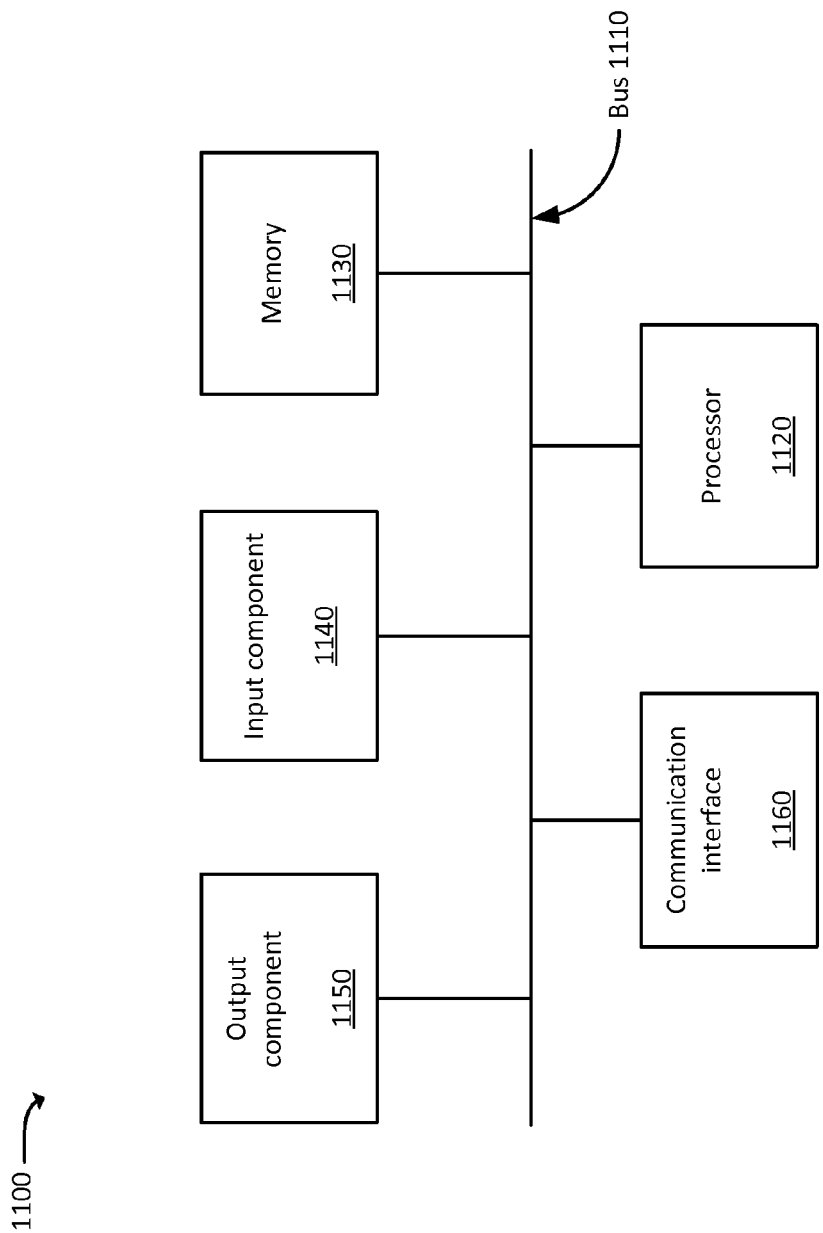
FIG. 11 illustrates example components of one or more devices, according to one or more implementations described herein.

FIG. 11 is a diagram of example components of device 1100. One or more of the devices described above (e.g., with respect to FIGS. 1, 2, 6, 7, and 10) may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes (LEDs), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks have been described with regard to FIGS. 4, 5, 8, and 9, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1, 2, 6, 7, and 10), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    determining a particular password generation algorithm, of a plurality of password generation algorithms, based on information regarding a client device;
    determining password generation seed values that include milestone dates, identified based on a security protocol that indicates a frequency at which BIOS passwords should be changed;
    generating a first password and one or more second passwords based on the particular password generation algorithm and the password generation seed values,
        the first password corresponding to a password that should be set for a BIOS associated with the client device,
        the one or more second passwords being possible current passwords currently set for the BIOS; and
    changing the BIOS password, at the client device, to be the first password, the changing of the BIOS password being based on using the one or more second passwords.

2. The method of claim 1, further comprising:
receiving, by one or more devices and from the client device, and when one of the one or more second passwords are valid, an indication that the BIOS password has been changed to the first password;
outputting, by the one or more devices, the indication that the BIOS password has been changed to the first password;
receiving, in response to outputting second passwords that are invalid, an indication that the BIOS password has not been changed;
requesting, based on receiving the indication that the BIOS password has not been changed, information regarding a list of one or more known passwords; and
individually outputting, the one or more known passwords to the client device to cause the client device to change the BIOS password to the first password,
wherein receiving the indication that the BIOS password has been changed to the first password includes receiving the indication when one of the one or more known passwords are valid.

3. The method of claim 1, further comprising:
receiving, by one or more devices and from the client device, and when one of the one or more second passwords are valid, an indication that the BIOS password has been changed to the first password;
outputting, by the one or more devices, the indication that the BIOS password has been changed to the first password;
receiving, in response to outputting second passwords that are invalid, an indication that the BIOS password has not been changed;
generating, based on receiving the indication that the BIOS password has not been changed, one or more alternate passwords based on a different password generation algorithm than the particular password generation algorithm; and
individually outputting, the one or more alternate passwords to the client device to cause the client device to change the BIOS to the first password,
wherein receiving the indication that the BIOS password has been changed to the first password includes receiving the indication when one of the one or more alternate passwords are valid.

4. The method of claim 1, wherein the seed values include a first seed value and one or more second seed values,
wherein determining the seed values includes:
determining the first seed value based on a current milestone date identified by the security protocol, and
determining the one or more second seed values based on previous milestone dates identified by the security protocol.

5. The method of claim 1, further comprising:
determining that a password is currently set for the BIOS,
wherein the one or more second passwords are determined based on the determination that the password is currently set for the BIOS.

6. The method of claim 1, further comprising:
individually outputting the one or more second passwords to the client device to cause the client device to remove a password currently set for the BIOS;
receiving an indication, when one of the one or more second passwords are valid, that the password, currently set for the BIOS, has been removed;
accessing the BIOS after receiving the indication that the password has been removed; and
performing the changing of the password after accessing the BIOS.

7. The method of claim 1, wherein the updating of the BIOS password, at the client device, is performed periodically.

8. The method of claim 1, wherein the updating of the password of the BIOS is performed based on execution of an imaging process at the client device.

9. A system comprising:
a device, comprising:
a non-transitory memory device storing:
a plurality of processor-executable instructions; and
a processor configured to execute the processor-executable instructions, wherein executing the processor-executable instructions causes the processor to:
determine a particular password generation algorithm, of a plurality of password generation algorithms, based on information regarding a client device;
determine password generation seed values that include milestone dates, identified based on a security protocol that indicates a frequency at which BIOS passwords should be changed;
generate a first password and one or more second passwords based on the particular password generation algorithm and the password generation seed values,
the first password corresponding to a password that should be set for a BIOS associated with the client device,
the one or more second passwords being possible current passwords currently set for the BIOS; and
changing the BIOS password, to be the first password, the changing of the BIOS password being based on using the one or more second passwords.

10. The system of claim 9, wherein executing the processor-executable instructions further causes the processor to:
receive, from the client device, and when one of the one or more second passwords are valid, an indication that the BIOS password has been changed to the first password;
output, by the one or more devices, the indication that the BIOS password has been changed to the first password;
receive, in response to outputting second passwords that are invalid, an indication that the BIOS password has not been changed;
request, based on receiving the indication that the BIOS password has not been changed, information regarding a list of one or more known passwords; and
individually outputting, the one or more known passwords to the client device to cause the client device to change the BIOS password to the first password,
wherein executing the processor-executable instructions, to receive the indication that the BIOS password has been changed to the first password, causes the processor to receive the indication when one of the one or more known passwords are valid.

11. The system of claim 9, wherein executing the processor-executable instructions further causes the processor to:
receive, from the client device, and when one of the one or more second passwords are valid, an indication that the BIOS password has been changed to the first password;
output, by the one or more devices, the indication that the BIOS password has been changed to the first password;
receive, in response to outputting second passwords that are invalid, an indication that the BIOS password has not been changed;

generate, based on receiving the indication that the BIOS password has not been changed, one or more alternate passwords based on a different password generation algorithm than the particular password generation algorithm; and individually output, the one or more alternate passwords to the client device to cause the client device to change the BIOS to the first password, wherein executing the processor-executable instructions, to receive the indication that the BIOS password has been changed to the first password, causes the processor to receive the indication when one of the one or more alternate passwords are valid.

12. The system of claim 9, wherein the seed values include a first seed value and one or more second seed values, wherein executing the processor-executable instructions, to determine the seed values causes the processor to:
determine the first seed value based on a current milestone date identified by the security protocol, and
determine the one or more second seed values based on previous milestone dates identified by the security protocol.

13. The system of claim 9, wherein executing the processor-executable instructions further causes the processor to:
determine that a password is currently set for the BIOS,
wherein the one or more second passwords are determined based on the determination that the password is currently set for the BIOS.

14. The system of claim 9, wherein executing the processor-executable instructions further causes the processor to:
individually output the one or more second passwords to the client device to cause the client device to remove a password currently set for the BIOS;
receive an indication, when one of the one or more second passwords are valid, that the password, currently set for the BIOS, has been removed;
access the BIOS after receiving the indication that the password has been removed; and
perform the updating of the password after accessing the BIOS.

15. The system of claim 9, wherein the updating of the BIOS password, at the client device, is performed periodically.

16. The system of claim 9, wherein the updating of the password of the BIOS is performed based on execution of an imaging process at the client device.

17. A method comprising,
receiving, by one or more devices and from a first client device, a request to remotely access a BIOS associated with a second client device;
validating, by the one or more devices, the request to remotely access the BIOS;
determining, by the one or more devices and based on validating the request, a particular password generation algorithm, of a plurality of password generation algorithms, based on information regarding the second client device;
determining, by the one or more devices, password generation seed values that include milestone dates, identified based on a security protocol that indicates a frequency at which BIOS passwords should be chan;
generating, by the one or more devices, a first password and one or more second passwords based on the particular password generation algorithm and the password generation seed values, the first password corresponding to a password that should be set for the BIOS associated with the second client device,
the one or more second passwords being possible current passwords currently set for the BIOS;

individually outputting, by the one or more devices, the one or more second passwords to the client device to cause the client device to remove a password currently set for the BIOS;

receiving, by the one or more devices, an indication, when one of the one or more second passwords are valid, that the password, currently set for the BIOS, has been removed;

outputting, by the one or more devices and after receiving the indication that the password has been removed, information to the first client device to cause the first client device to access the BIOS of the second client device; and causing, by the one or more devices, the second client device to set the password to the first password after the first client device is no longer accessing the BIOS.

18. The method of claim 17, wherein receiving the request includes receiving at least one of:
first authentication credentials,
an encrypted computer file, or
a first hash value,
wherein the validating includes at least one of:
decrypting the computer file,
determining that the first authentication credentials match second authentication credentials stored by the one or more devices,
calculating a second hash value and determining that the second hash value matches the first hash value.

19. The method of claim 17, further comprising:
receiving, in response to outputting second passwords that are invalid, individual indications that the BIOS password has not been updated;
requesting, based on receiving individual indications that the BIOS password has not been removed when all of the one or more second passwords have been outputted to the client device, information regarding a list of one or more known passwords; and
individually outputting, the one or more known passwords to the client device to cause the client device to remove the BIOS password,
wherein receiving the indication that the BIOS password has been removed includes receiving the indication when one of the one or more known passwords are valid.

20. The method of claim 17, further comprising:
receiving, in response to outputting second passwords that are invalid, individual indications that the BIOS password has not been updated;
generating, based on receiving individual indications that the BIOS password has not been removed when all of the one or more second passwords have been outputted to the client device, one or more alternate passwords based on a different password generation algorithm than the particular password generation algorithm; and
individually outputting, the one or more alternate passwords to the client device to cause the client device to update the BIOS to the first password,
wherein receiving the indication that the BIOS password has been removed password includes receiving the indication when one of the one or more alternate passwords are valid.

* * * * *